UNITED STATES PATENT OFFICE.

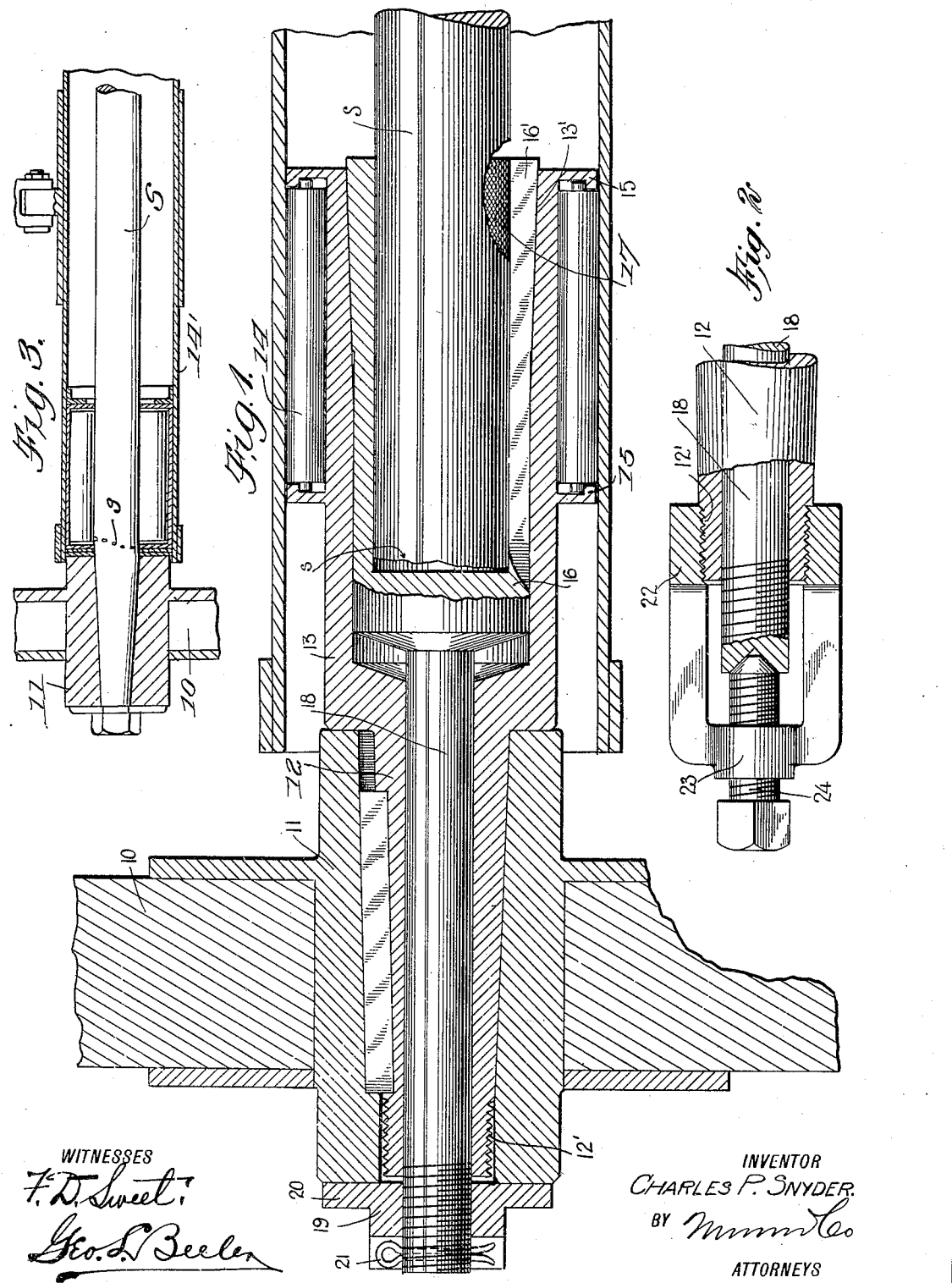
C. P. SNYDER.
EMERGENCY AXLE.
APPLICATION FILED JAN. 25, 1913.
1,094,486.
Patented Apr. 28, 1914.
INVENTOR
CHARLES P. SNYDER.

CHARLES PERRY SNYDER, OF SLATINGTON, PENNSYLVANIA.

EMERGENCY-AXLE.

1,094,486. Specification of Letters Patent. Patented Apr. 28, 1914.

Application filed January 25, 1913. Serial No. 744,176.

*To all whom it may concern:*

Be it known that I, CHARLES P. SNYDER, a citizen of the United States, and a resident of Slatington, in the county of Lehigh and State of Pennsylvania, have invented a new and Improved Emergency-Axle, of which the following is a full, clear, and exact description.

This invention relates to machine parts and has particular reference to a means for repairing a broken shaft or axle in a simple and reliable easily applied manner.

More definitely stated, one of the objects of this invention is to provide an emergency device or appliance adapted to be carried in the tool chest of an automobile, and so constructed that in the case of breakage of one of the driving axles, the wheel may be removed from the broken part and the emergency appliance connected to the remaining part of the axle, and the wheel then connected to the emergency device.

A further object of the invention is to provide a means coöperating with the emergency device whereby it may be disconnected from the broken axle when a new axle is to be introduced and such appliance held in reserve so that it may be subsequently used in the event of another axle breakage.

The foregoing and other objects of this invention will hereinafter be more fully described and claimed and illustrated in the drawings forming a part of this specification in which like characters of reference indicate corresponding parts in the views, and in which—

Figure 1 is a longitudinal section showing a preferred form of the appliance; Fig. 2 is a similar view of the means for removing the broken axle from the emergency axle as already intimated, and Fig. 3 is a view illustrating a conventional form of axle and indicating the place where such axles commonly break.

The several parts of the device may be made of any suitable materials and the relative sizes and proportions thereof may be varied in accordance with the various types of machines to which the invention is applicable without departing from the spirit thereof as hereinafter claimed.

Referring more particularly to the drawings, I show at S a portion of a shaft or axle which remains after the wheel end portion thereof has been broken from it at $s$, it being a well recognized fact that in certain types of automobile construction the vast majority of breaks in such axles occur between the wheel and the roller bearing support.

At 10 is shown a fragment of a wheel having a hub 11 which is understood under normal conditions to be rigidly secured upon the outer end of the axle, namely, that portion of the axle which was broken from the main portion at $s$. It will hence be understood that such portion of the axle will preferably be tapered to conform with the interior taper of said hub 11. My emergency device, therefore, comprises a spindle 12 tapered as a counterpart of said hub taper and being substantially the same size and shape as the broken end of the axle above referred to. Said spindle 12 is constructed as an integral part of a casing 13 which will be understood as being adapted to take the place of the usual bearing member which ordinarily is provided with a conventional set of anti-friction rollers 14, the rollers being maintained in connection with the bearing in any suitable manner as, for instance, by contact with the inner surface of the shaft casing 14′. This casing with the rollers 14 attached thereto and secured in place as by overlapping flanges 15 will therefore be substituted for the bearing normally used, it being understood, as before intimated, that these parts will be made interchangeable with respect to any standard type of machine.

Another main portion of the emergency axle is a chuck 16 having any suitable number of longitudinal slits 16′, said chuck being externally tapered so as to conform with the slight internal taper of the casing, as shown at 13′. The interior of the chuck is adapted to receive the main portion of the broken axle which fits into the chuck with an easy but practically close fit. The said interior face of the chuck may be knurled as shown at 17, if desired, for the purpose of increasing the grip thereof upon the axle. Extending outwardly from the closed end of the chuck is a shank 18 which projects through the center of the spindle 12 and is adapted to receive any suitable means serving a dual purpose, namely to force the hub 11 upon the spindle and maintain it in such position and also to draw the shank and chuck longitudinally of the spindle and casing, whereby the axle S is firmly gripped in place, making it, together with the spindle 12, the substantial equivalent of the original axle. Such means applied to the outer end of the shank is shown as comprising a nut 19 having threaded engagement with the outer end of the shank and having a flange 20 bearing directly against the outer end of the hub. The nut 19 may be locked in place by any suitable means, such, for instance, as a cotter pin 21 to prevent accidental loosening of the parts. For all practical purposes, therefore, the construction just described and illustrated in Fig. 1 constitutes a complete substitute for the original axle, roller bearing support and bearing rollers, together with any means necessary to secure the wheel in place upon the axle or spindle.

The spindle is provided at its outer end with a screw thread 12' which I use for the purpose of removing the chuck 16 from the casing 13 after the wheel has been removed from the spindle. For this purpose I employ a cap or yoke 22 having an internal thread for coöperation with the thread 12' aforesaid, said yoke being provided with a hub 23 in alinement with said shank 18. A screw 24 is tapped through said hub 23 and bears against the outer end of the shank, as shown in Fig. 2. When force is applied through said screw and yoke to the shank 18, the chuck will be forcibly ejected from the casing and will therefore release its grip upon the axle S.

Having thus described my invention, I claim as new and desire to secure by Letters Patent:—

1. In a device of the character set forth, the combination with a wheel hub, of a spindle to which the wheel hub is adapted to be connected, a casing for the spindle, an axle, and means operating through said spindle and casing to secure said axle in operative relation to said spindle and wheel hub, said securing means operating also to secure the hub upon the spindle.

2. In a device of the character set forth, the combination of a spindle, a bearing support connected to said spindle, a chuck within the bearing support, a shank extending through and beyond said spindle to move the chuck longitudinally of the bearing support, and means applied to the outer end of the spindle whereby such movement is effected.

3. In a device of the character set forth, the combination of a spindle, a casing connected to the spindle, a chuck adapted to grip an axle and movable longitudinally of said casing, a shank connected to the chuck and connected to said spindle, and screw threaded means applied to the outer end of the spindle for the purpose of forcibly moving the chuck and shank longitudinally of the casing and spindle, substantially as set forth.

In testimony whereof I have signed my name to this specification in the presence of two subscribing witnesses.

CHARLES PERRY SNYDER.

Witnesses:
   E. M. PETERS,
   CHARLES D. PETERS.

---

Copies of this patent may be obtained for five cents each, by addressing the "Commissioner of Patents, Washington, D. C."